April 13, 1965     R. H. PINTELL     3,178,625
ELECTROMAGNETIC SYSTEM
Filed June 14, 1961
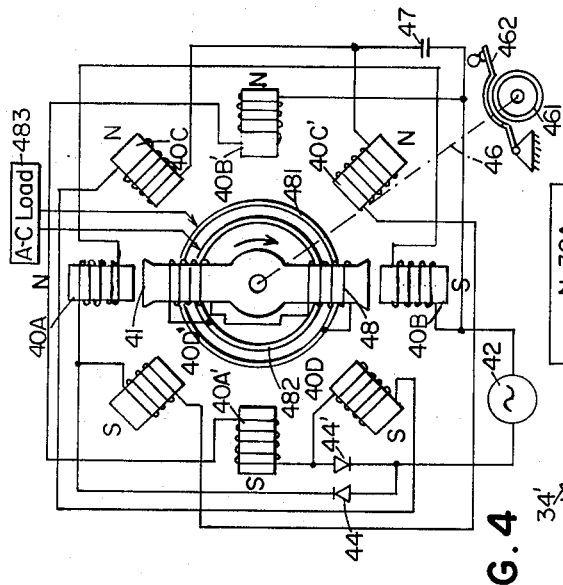
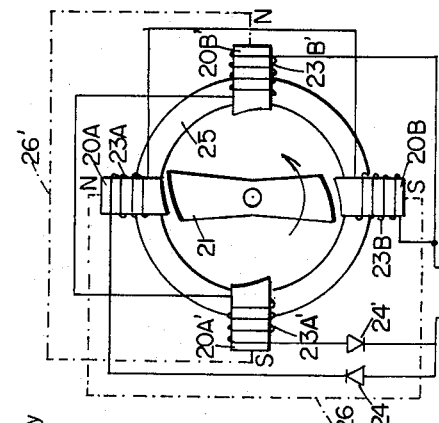
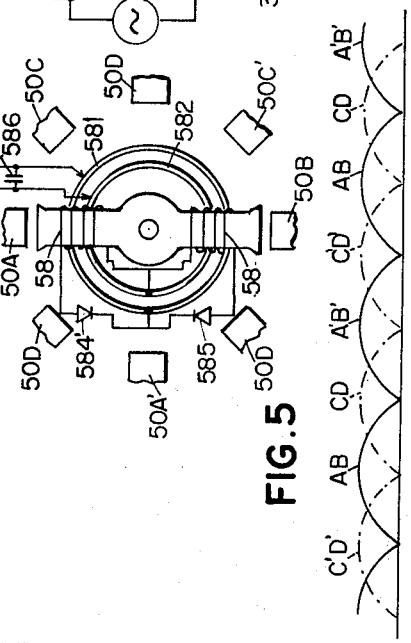
Robert H. Pintell
*INVENTOR.*
BY
AGENT.

3,178,625
ELECTROMAGNETIC SYSTEM
Robert H. Pintell, New York, N.Y., assignor to Intron International, Inc., Bronx, N.Y., a corporation of New York
Filed June 14, 1961, Ser. No. 117,170
3 Claims. (Cl. 318—138)

My present invention relates to a system for generating periodic motion (e.g., rotation or oscillation) by electromagnetic means.

An important object of this invention is to provide means for generating such motion in the simplest way possible, i.e., with the aid of a single source of controlling current and a passive controlled element, while suppressing all commutators and other mechanical switching devices heretofore required for this purpose.

Another object of the invention is to provide systems of this type adapted to operate at frequencies or rotary speeds unattainable with conventional arrangements.

A further, more specific object of my invention is to provide novel means for producing an adjustable output current, readily variable as to frequency and/or magnitude, from a fixed-frequency source of alternating input voltage.

In accordance with the instant invention I realize the foregoing objects, and others which will subsequently appear, essentially with the aid of a source of single-phase alternating current, a pair of electromagnetic flux generators such as coils (or sets of such coils) excitable from such source, and oppositely poled rectifiers connected in circuit (preferably in series) therewith for alternately energizing these coils during respective half-cycles of the alternating current, these coils being positioned at different locations in the vicinity of a controlled ferromagnetic element of non-permanent character, i.e., an element of so-called soft magnetic material, so as to draw it into different positions during respective portions of a cycle. The controlled element may, for example, be a membrane with a suitable magnetic coating positioned between the two alternately excitable electromagnets, or sets of electromagnets, to act as a loudspeaker diaphragm, a supersonic vibrator or some other generator of mechanical oscillations; it may also be a rotor for a synchronously operating electromotor whose stator is constituted by two or more pole pairs energized in cyclic succession by the rectified input of the alternating-current source.

When the system of my invention is used in conjunction with an electromotor as described above, its rotor may also be used as a carrier for a secondary winding so that an output current is induced therein. When the rotor is braked to standstill, this current will have a frequency equal to that of the source; when it is allowed to turn at synchronous speed, the output voltage will have a more complex wave shape with a fundamental frequency equal to half the source frequency. If desired, this output current may also be rectified on the rotor and taken off as unidirectional current by means of slip rings.

In order to insure smoother operation of my improved synchronous motor, I prefer to provide it with four pole pairs (or a larger even number of pairs) so arranged that any two consecutive poles energized at alternate half-cycles of the source voltage, i.e., via oppositely poled rectifiers, are separated by at least one intermediate pole supplied from the same source, through the same or similar rectifier means, with a suitable phase shift so as to bridge the interval between energizations of the first-mentioned poles. Thus, with $2(n+1)$ pole pairs ($n$ being any integer) there will be two pole pairs alternately energized directly from the source and $2n$ pole pairs similarly energized with interposition of appropriate phase-shifting networks or impedances.

The invention will be described in greater detail with reference to the accompanying drawing in which:

FIG. 1 illustrates diagrammatically a vibratory system embodying the invention;

FIG. 2 is a diagrammatic representation of a synchronous motor constructed in accordance with the invention;

FIGS. 3, 4 and 5 are views generally similar to FIG. 2, illustrating modifications of the motor assembly; and FIG. 6 is a graph indicating the pattern of energization of the stator poles in the motor of FIGS. 4 and 5.

In FIG. 1 I show a vibratory system including a flexible diaphragm 11, e.g., of paper or synthetic plastic material, resiliently suspended between two stator poles 10, 10'. A source of alternating current, schematically indicated at 12, energizes the windings 13, 13' of the horseshoe-shaped poles 10, 10' by way of respective half-wave rectifiers 14, 14' connected with opposite polarity across the source 12 so that alternate half-cycles of its output pass through the two windings as illustrated at $a$ and $b$. The diaphragm 11 carries at least one layer of "soft," i.e., non-permanently magnetizable, ferromagnetic material such as iron or a suitable alloy applied thereto by spraying, sputtering, electrodeposition or similar processes. This layer, accordingly, responds indiscriminately to flux of either polarity so that the membrane 11 is alternately attracted toward the right and toward the left, as symbolized by the arrows, in the rhythm of the oscillations of the output of source 12.

FIG. 2 illustrated the application of this principle to an electromotor having stator poles 20A, 20B, 20A' and 20B' co-operating with a rotor 21 of "soft" ferromagnetic material, i.e., material with a minimum of residual magnetism. The stator poles, mounted on a stationary support 25, have beveled faces defining skew gaps with the rotor 21 to provide a preferred direction of rotation (here counterclockwise, as indicated by the arrow) as is well known per se.

The windings 23A, 23B and 23A', 23B' of opposite poles are serially interconnected in such sense that the fluxes therethrough reinforce each other; each of these pairs of pole windings is further connected across alternating-current source 22 by way of a respective half-wave rectifier 24, 24'. Thus, each pole pair is traversed by magnetic flux during a respective half-cycle of the output of source 22 so as to tend to align the highly permeable rotor 21 with it. The skew configuration of the gap tends to displace the rotor by a slight angle in counterclockwise direction from a position of precise alignment whereby each half of rotor 21 will successively be attracted toward poles 20A, 20A', 20B and 20B'. In steady-state operation the rotor will pass a pole pair at substantially the instant when the flux therethrough returns to zero so that the magnetic pull will always be in forward direction. Naturally, the smoothness of rotation may be enhanced by conventional means such as the mounting of a flywheel on the rotor shaft.

The outer, oppositely poled faces of each pole pair 20A, 20B and 20A', 20B' may be interconnected by respective ferromagnetic yokes 26, 26' as schematically indicated in dot-dash lines.

The number of pole pairs may, if desired, be increased to four, six etc., with the stator poles alternately connected in series with rectifiers 24 and 24' in such manner that diametrically opposite or otherwise non-adjacent poles are magnetized in opposite senses, i.e., respectively inward and outward, as seen from the rotor axis. In FIG. 3, for example, I have shown a modified rotor comprising two highly permeable arcuate strips 31a, 31b on a non-magnetic carrying disk 31, these strips subtending arcs of 90° so as to bridge alternate stator poles of an eight-pole array 30A, 30A', 30B, 30B', 30C, 30C', 30D and 30D'.

Poles 30A, 30B, 30C, 30D are serially energized from source 32 via a half-wave rectifier 34, their coils being so wound that any two of these poles lying in quadrature to each other form a pair adapted to be bridged by the strips 31a, 31b with aiding flux in different angular positions of the rotor 31; poles 30A', 30B', 30C', 30D' are similarly connected across source 32 in series with an oppositely oriented rectifier 34'. The outer pole faces of each set of stator poles 30A, 30B, 30C, 30D and 30A', 30B', 30C', 30D' may again be interconnected by a respective yoke such as those indicated in FIG. 2 at 26 and 26'.

The operation of the motor of FIG. 3 is generally similar to that of FIG. 2, except that rotor 21 makes half a revolution during each cycle of source 22 whereas rotor 31 passes only through 90° in the course of a cycle. It will be observed that in each instance the direction of flux through the rotor reverses every 180 electrical degrees, i.e., after a permeable rotor member 21 or 31a, 31b has moved through positions of alignment with two successive stator pairs. The gaps between rotor disk 31 and the inner faces of poles 30A etc. have been shown skewed for the purpose and in the manner described with reference to FIG. 2.

The motor of FIG. 4 also comprises an array of eight stator poles 40A, 40B, 40C, 40D, 40A', 40B', 40C', 40D'. The two pairs of diametrically opposite poles 40A, 40B and 40A', 40B' of one set (bridged again, if desired, by respective yokes not shown in this figure) are energized from a source 42 via respective rectifiers 44, 44' in the same manner as the similarly designated poles of FIG. 2; the remaining two pole pairs 40C, 40D and 40C' and 40D' of the other set, interleaved with those of the first set, are analogously energized via the same circuit 42, 44, 44' by way of a 90° phase shifter here shown as a condenser 47. This mode of connection results in the successive and partly overlapping energization of consecutive pole pairs in cyclic succession, as illustrated in FIG. 6 which shows the operative half-cycles of these pole pairs identified by their alphabetic designations AB, CD, A'B', C'D'. It will be apparent that a definite sense of rotation (here clockwise) is thus imparted to the rotor-controlling field so that a skewing of the flux gaps becomes unnecessary.

FIG. 4 also illustrates the possibility of utilizing the rotor of a system according to the invention as the core of a secondary winding 48 whose terminals are connected via slip rings 481, 482 to an alternating-current load 483. The rotor shaft 46 is shown to carry a flywheel 461 adapted to be braked to standstill by a lever 462. When the rotor 41 is thus held stationary, the frequency of the alternating current passing through load 483 will equal that of the output of the generator 42; when the lever 462 is lifted to let the rotor run freely in synchronism with the field, the polarity of the flux through rotor 41 will be reversed after each half-turn, as is apparent from the polarity of magnetization indicated at each stator pole, so that the fundamental frequency of the load current will be half the input frequency.

The system of FIG. 5 is generally similar to that of FIG. 4, with a rotor 51 controlled by eight stator poles 50A to 50D and 50A' to 50D' whose mode of connection has not been further illustrated. The rotor 51 again carries a secondary winding 58 which, however, is here connected to the slip rings 581, 582 via a full-wave-rectification circuit comprising a pair of diodes 584, 585 rotating with these rings and the rotor. A smoothing condenser 586 is shown connected across the direct-current load 583 energizable from this system.

In both FIGS. 4 and 5 a physical load, such as the flywheel 461, may be mechanically entrained by the rotor concurrently with the actuation of an electrical load 483 or 583.

Although I have described and illustrated several circuit arrangements representative of different embodiments of my invention, it is to be understood that combinations of features shown in separate figures, within the limits of compatibility, and other modifications and adaptations are possible without departing from the spirit and scope of the invention as defined in the appended claims. It will be apparent, for example, that alternate conduction through respective flux generators or coil windings may be realized also by means of rectifiers connected in shunt therewith rather than in series as shown, though such mode of connection will usually be more wasteful and therefore less desirable. Also, a secondary winding such as that shown in FIGS. 4 and 5 may be provided on an oscillating membrane of the type illustrated in FIG. 1, e.g., in the form of a spiral conductive strip sprayed or otherwise deposited thereon as more fully disclosed in my co-pending application Ser. No. 117,169, filed on even date herewith; such a spiral strip may supplement the magnetically permeable layer or be itself composed of soft iron or the like to act as the magnetizable layer.

I claim:
1. An electromagnetic motor comprising a source of alternating current, at least two pairs of electromagnetic windings angularly spaced about an axis, the windings of one pair being interleaved with those of the other pair, a rotor rotatable about said axis, said rotor including at least one element of a material of high permeability and low residual magnetism successively alignable with said pairs of windings, circuit means connecting each of said pairs across said source for energization in a sense creating aiding fluxes through said element upon alignment thereof with the respective pair, said circuit means including at least two oppositely poled rectifier diodes for alternately energizing said pairs from respective half-cycles of said alternating current, at least two additional pairs of electromagnetic windings interleaved with the first-mentioned pairs in angularly spaced relationship therewith, and further circuit means connecting each of said additional pairs across said source for aiding energization from respective half-cycles of said alternating current, said further circuit means including phase-shifting means for energizing said additional pairs in staggered relationship to said first-mentioned pairs, said rectifiers being respectively connected to said additional pairs through said further circuit means.

2. A motor according to claim 1, further comprising secondary-winding means carried on said rotor, and circuit means for connecting said secondary-winding means to a load energizable by induced current.

3. A motor according to claim 2, further comprising control means for selectively varying the frequency of said induced current by braking said rotor.

References Cited by the Examiner

UNITED STATES PATENTS

| 1,066,494 | 7/13 | Held | 310—152 |
| 2,421,431 | 6/47 | Pell | 318—232 |
| 2,450,982 | 10/48 | O'Brien | 310—208 |
| 2,703,370 | 3/55 | Steensen | 310—152 X |
| 2,798,998 | 7/57 | Marks | 318—318 |
| 2,835,859 | 5/58 | Burns | 318—232 |
| 2,845,588 | 7/58 | Sampietro | 318—231 |

FOREIGN PATENTS

| 454,664 | 2/49 | Canada. |
| 736,151 | 6/43 | Germany. |

JOHN F. COUCH, *Primary Examiner.*